United States Patent [19]

Song

[11] Patent Number: 5,861,635
[45] Date of Patent: Jan. 19, 1999

[54] LIQUID CRYSTAL DISPLAY INCLUDING A COPLANAR LINE STRUCTURE

[75] Inventor: In Duk Song, Kunpo-shi, Rep. of Korea

[73] Assignee: LG Electronics Inc., Seoul, Rep. of Korea

[21] Appl. No.: 744,339

[22] Filed: Nov. 7, 1996

[30] Foreign Application Priority Data

Dec. 28, 1995 [KR] Rep. of Korea .................. 1995 61450

[51] Int. Cl.$^6$ .......................... H01L 29/04; H01L 31/036; H01L 31/0376; H01L 31/20
[52] U.S. Cl. .............................. 257/59; 257/72; 257/350; 257/390
[58] Field of Search ............................... 257/59, 72, 350, 257/390

[56] References Cited

U.S. PATENT DOCUMENTS 5,604,358  2/1997  Kim ........................................... 257/59
5,684,365  11/1997  Tang et al. ............................. 315/169.3
5,757,453  5/1998  Shin et al. ................................. 349/122

*Primary Examiner*—Ngân V. Ngô
*Attorney, Agent, or Firm*—Morgan, Lewis & Bockius LLP

[57] ABSTRACT

A liquid crystal display device includes a substrate, a plurality of gate lines and source lines on the substrate and in a same layer, and a plurality of trench portions on sides of the gate lines. The trench portions electrically separate the source lines from the gate lines and each separated source line has a contact area placed at a distance from the trench portions. A first insulating layer is formed on the source and gate lines and a second insulating layer is formed on the first insulating film and in the trench portions. A conductive layer is formed on the second insulating layer and electrically connects the source lines to each other through the contact areas. The conductive layer includes source, drain electrode, and pixel electrodes.

4 Claims, 8 Drawing Sheets

LIQUID CRYSTAL DISPLAY INCLUDING A COPLANAR LINE STRUCTURE

BACKGROUND OF THE INVENTION

1. Field of the Invention

The present invention relates to a liquid crystal display device and method, and more particularly, to a liquid crystal display including a coplanar line structure and related method.

2. Discussion of the Related Art

A group of switching devices in which active elements such as thin film transistors (hereinafter called "TFT") are integrated is used for driving and controlling each pixel in an active matrix liquid crystal display device. As shown in FIG. 1, in a conventional liquid crystal display with a TFT array, pixel electrodes 12 that are almost rectangular are closely arranged in rows and columns on a transparent substrate 11. A plurality of gate lines 13 are respectively formed closely along rows of the pixel electrodes 12 and a plurality of source lines 14 are respectively formed closely along the columns of the pixel electrodes 12. FIG. 2 is a plan view showing a part of the liquid crystal display elements of the liquid crystal display with a TFT array. FIG. 3 shows an intersection where gate and source lines cross each other perpendicularly in FIG. 2.

Referring to FIG. 2, first, an insulating film covering the gate lines 13 is formed on a transparent substrate 11 and a plurality of source lines 14 which perpendicularly cross the gate lines 13 are formed in parallel on the insulating film. Also, a semiconductor layer is formed around each intersection of the gate lines 13 and source lines 14 after the insulating film is formed on the gate lines 13 and the gate electrodes. Drain and source electrodes are formed facing each other on the semiconductor layer. Thus, non-linear active element TFTs are formed. In the TFT structure, the drain electrodes are formed in such a manner as to be electrically connected with transparent pixel electrodes on the insulating film. The semiconductor layer and the drain and source electrodes are covered with an insulating protective film. These TFTs basically include the gate electrodes, the insulating films, the semiconductor layers, and the drain and source electrodes, which are formed by repeating processes of making films and photoetching.

However, since the gate lines 13 and the source lines 14 are on different levels, as shown in FIG. 3 in which 25 is an anodized film and 26 is an insulating film, the process of forming the source lines 14 can only be done after the process of forming the gates lines 13. As a result, when the source lines 14 cross over the step-coverage of the gates lines 13, poor quality in tapers of the metal layers forming the gate lines and failures resulting from the stress of metal layers forming the source lines result in imperfect contacts of the source lines, disconnection in cross-over sections, and disconnection in the insulating film edges (hereinafter called "open-lines"). Moreover, parasitic capacitance in the step-coverage results in signal delays on the circuit of the gates lines.

SUMMARY OF THE INVENTION

Accordingly, the present invention is directed to a liquid crystal display and method that substantially obviates one or more of the problems due to limitations and disadvantages of the related art.

An object of the present invention is to provide a liquid crystal display device and method including a coplanar line structure that minimizes open-lines.

Another object of the present invention is to provide a liquid crystal display device and method that make it possible to form signal lines on the same level of a layer when manufacturing the TFTs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for manufacturing a liquid crystal display device including a thin-film transistor, comprises the steps of forming a metal layer on a substrate; patterning the metal layer to form a plurality of gate lines and a plurality of source lines adjacent the plurality of gate lines; defining a plurality of first portions and a plurality of second portions on the metal layer at respective distances from the gate lines; forming an insulating layer over the gate lines and the source lines at portions other than the plurality of the first and second portions; electrically separating the source lines at sides of the gate lines by removing portions of the insulating layer corresponding to the first portions of the source lines, each separated source line including one of the first portions and one of the second portions; forming a protective layer over the removed portions of the insulating layer; exposing the source lines at the second portions by removing corresponding portions of the protective layer and the insulating layer; electrically connecting the separated source lines through the second portions of the source lines.

In another aspect, the present invention provides a liquid crystal display device including a pixel electrode and a thin film transistor having gate, source, and drain electrodes, comprising substrate; plurality of gate lines and source lines on the substrate and in a same layer; plurality of trench portions on sides of the gate lines, the trench portions electrically separating the source lines from the gate lines, each separated source line having a contact area placed at a distance from the trench portions; first insulating layer on the source and gate lines; second insulating layer on the first insulating film and in the trench portions; conductive layer on the second insulating layer, the conductive layer electrically connecting the source lines to each other through the contact areas, the conductive layer including the source electrode, the drain electrode, and the pixel electrode.

In another aspect, the present invention provides a method for manufacturing a liquid crystal display including the steps of depositing a metal layer on a transparent glass substrate; forming the gate lines and the source lines perpendicularly crossing the gate lines by patterning the metal layer; anodizing the gate and source lines except first and second parts of the source lines placed at a predetermined distance from both sides of the gate lines; forming anodized gate lines and an insulating film on the source lines; electrically separating the source lines from both sides of the gate lines by removing the un-anodized first parts of the source lines and the insulating film thereon; forming a protective film on the insulating film and the first parts of the source lines removed therefrom; exposing the un-anodized parts of the source lines by removing the protective film and the insulating film, each being on the second parts of the source lines; electrically connecting the source lines separated into two parts by the gate lines by forming a conductive layer on the protective film and the exposed parts of the source lines.

In a further aspect, the present invention provides a liquid crystal display device including a plurality of gate lines and a plurality of source lines perpendicularly crossing each other on the same layer level of a transparent glass substrate; a plurality of trench parts on both sides of the gate lines to electrically separate the source lines from the gate lines; an anodized film on the gate lines and the source lines except at contact parts placed at a predetermined distance from both sides of the trench parts; an insulating film on the anodized film; a protective film, which fill in the trench parts, is on the insulating film; a conductive layer on the protective film on the gate lines and, being connected with the source lines through the contact parts, electrically connects the separated source lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
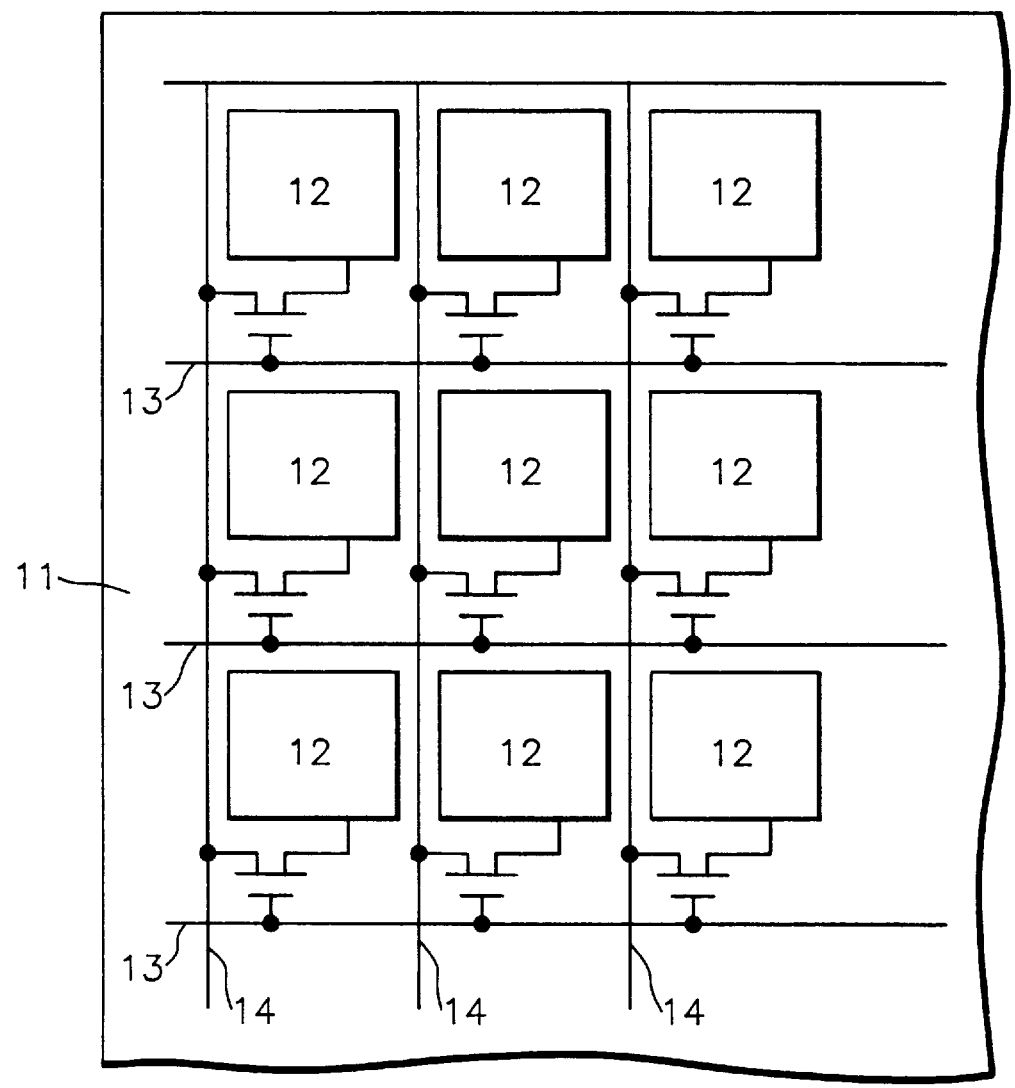
FIG. 1 is a circuit diagram showing a part of a liquid crystal display device.
Figure 2:
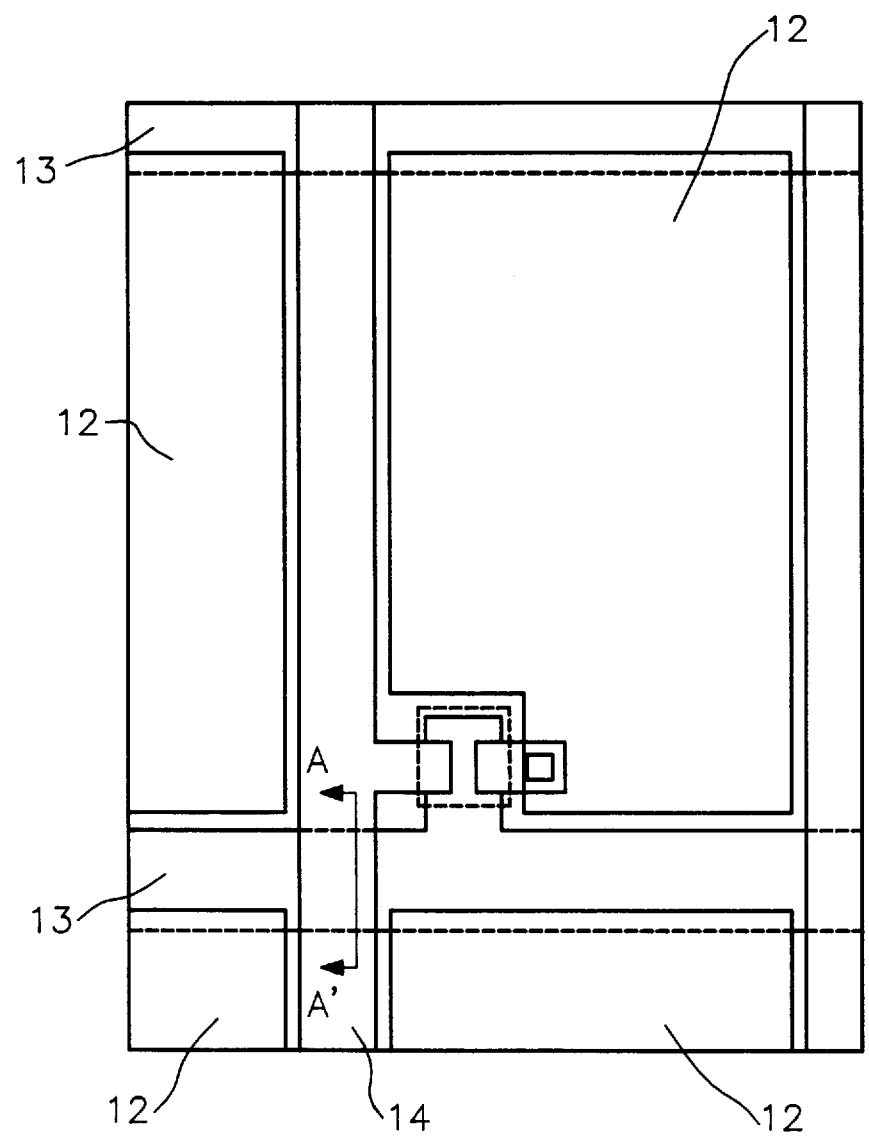
FIG. 2 is a plan view showing a part of liquid crystal display elements of a liquid crystal display device.
Figure 3:
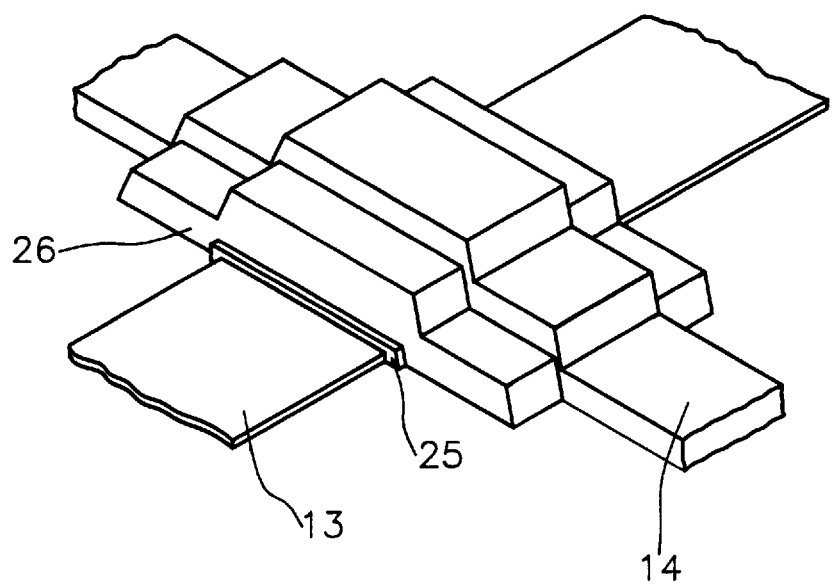
FIG. 3 is a three-dimensional illustration taken along line I–I' of FIG. 2, where source and gate lines cross over each other.
Figure 4:
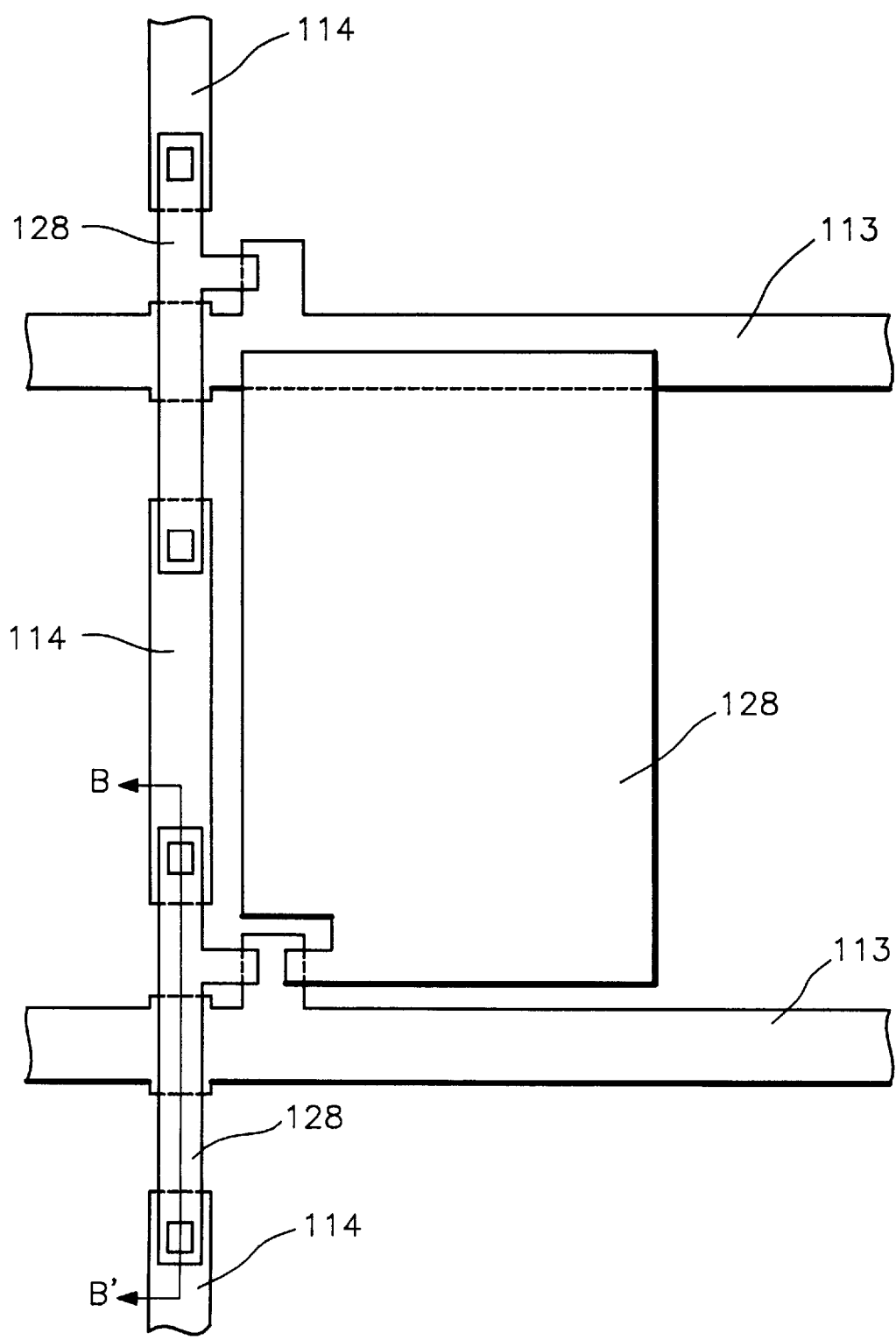
FIG. 4 is a plan view showing a liquid crystal display device including a coplanar line structure in the preferred embodiment of the present invention.

As shown in FIG. 4, the liquid crystal display devices manufactured by the method of the present invention have the following line structure. Gate lines 113 and source lines 114 are perpendicular to each other on a same layer level of a transparent glass substrate 111. Trench parts are formed on both sides of the gate lines 113 to electrically separate the source lines 114 from the gate lines 113. An anodized film 125 is formed on the gate lines 113 and the source lines 114 except at the contact parts located at a predetermined distance from both sides of the trench parts. An insulating layer 126 is formed on the anodized film 125 and a protective film 127 is filled in the trench parts and formed on the insulating film 126. A conductive layer 128 is formed on the protective film 127 on the gate lines 113 and connected to the source lines 114 through the contact parts in order to electrically connect the separated source lines 114.

Preferred Embodiment 1

Figure 5A:
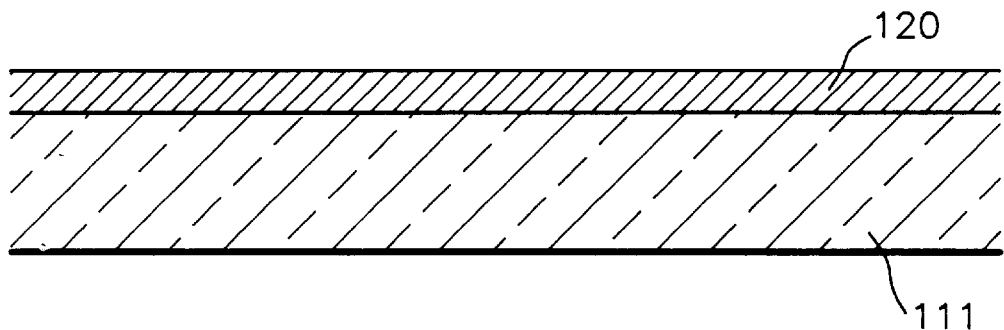
FIGS. 5A to 5H are sectional views illustrating the manufacturing process of a liquid crystal display device including a coplanar line structure of the present invention.
Figure 5B:
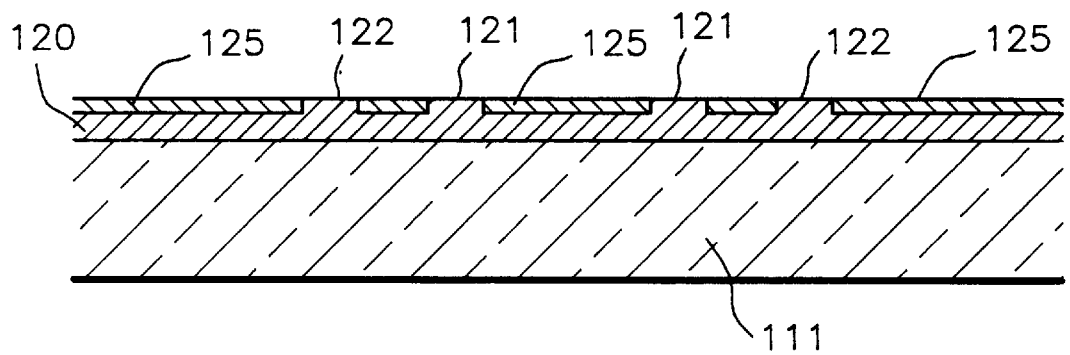
Figure 5C:
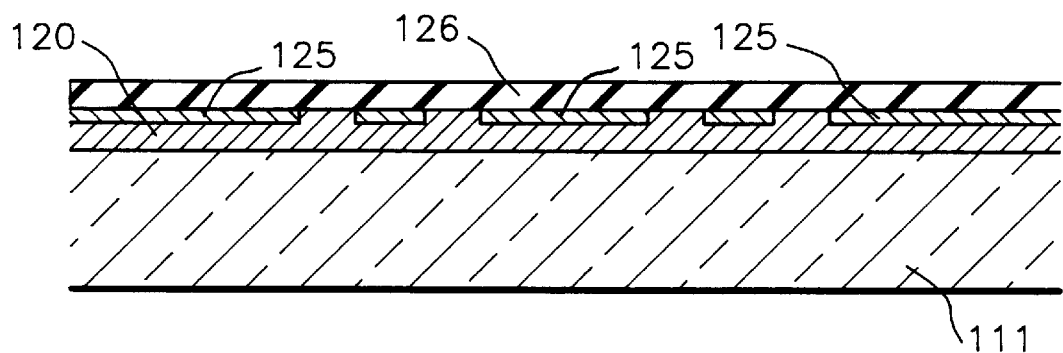
Figure 5D:
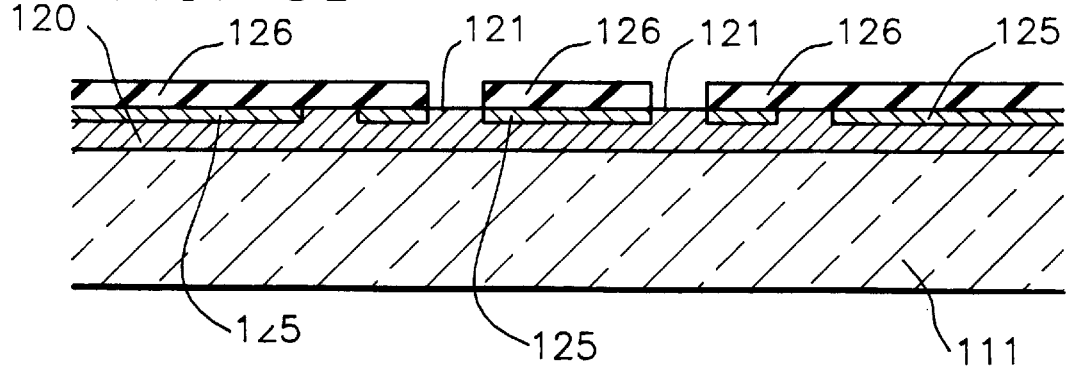
Figure 5E:
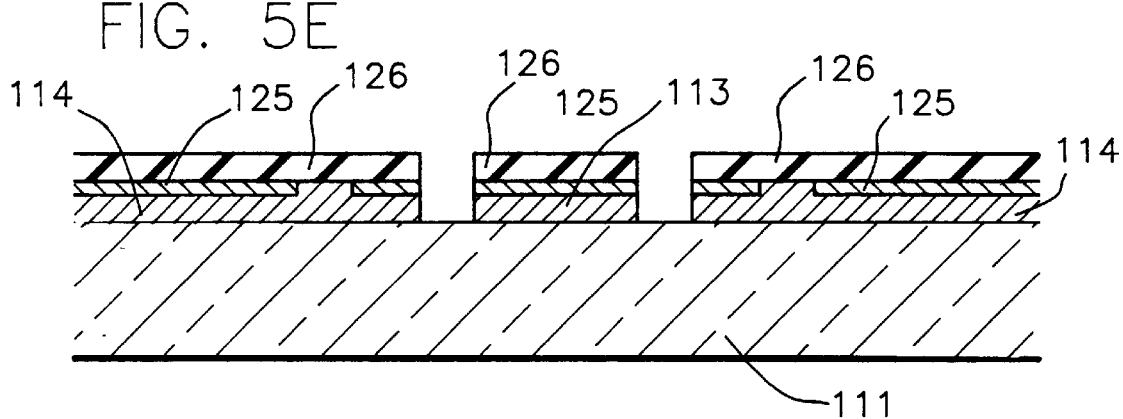
Figure 5F:
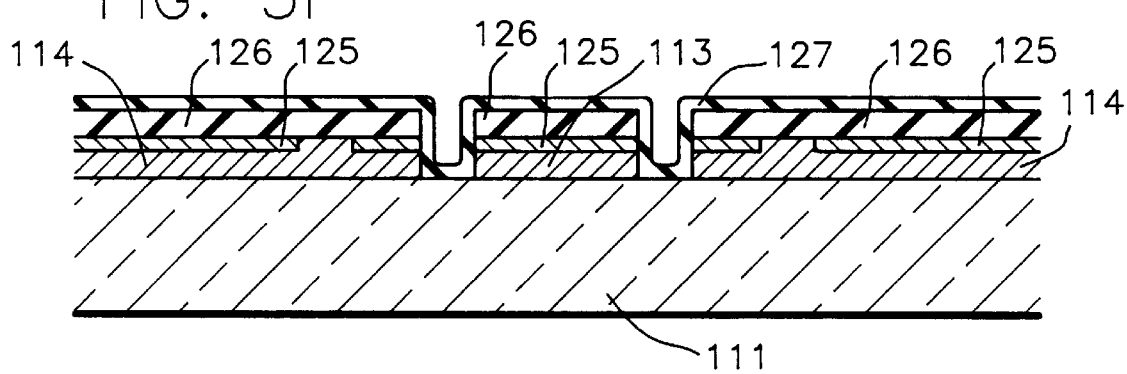
Figure 5G:
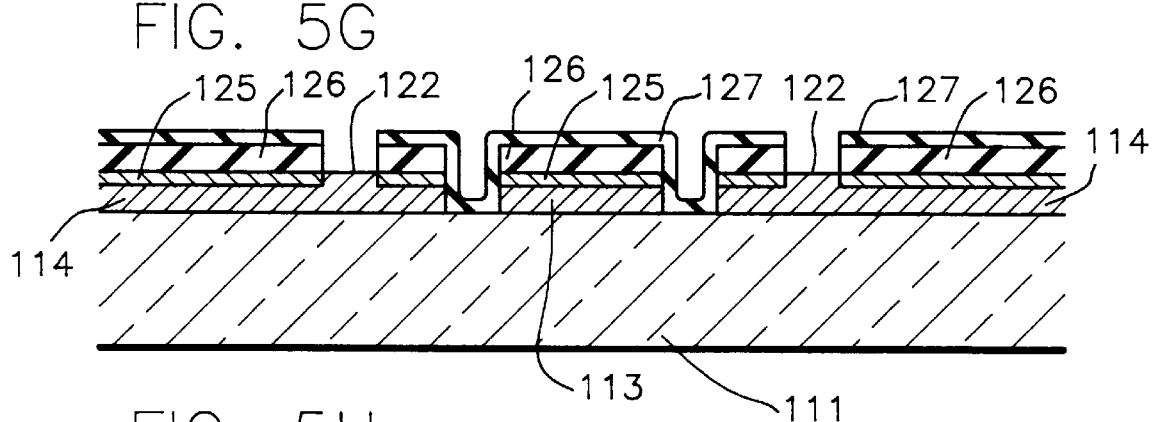
Figure 5H:
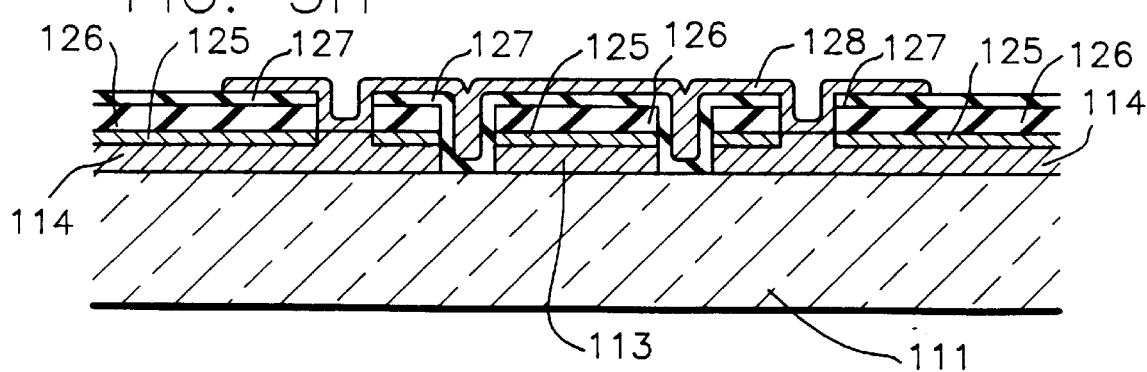

With reference to FIGS. 5A–5H, a method for manufacturing a liquid crystal display device including a coplanar line structure according to the present invention will be described. First, a metal layer 120, which is to be formed into a plurality of gate 113 and source 114 lines, is formed on a transparent glass substrate 111 by depositing a metal that is capable of being anodized, such as AlTa or Ti as shown in FIG. 5A. The gate lines 113 and the source lines 114 are anodized, except for first parts 121 at both sides of the source lines 114 in contact with the gate lines 113 and for second parts 122 of the source lines 114 placed at a predetermined distance from the gate lines 113. This enhances their heat-resistance, chemical-resistance, and durability, and further enhances the degree of insulation of the gate lines with the insulating film 126 on them. The insulating film 126 made of SiNx or any compound having SiNx is formed on the substrate 111, as shown in FIG. 5C. Trenches are formed by removing un-anodized first parts 121 of the source lines 114 and the corresponding portion of the insulating film 126 thereon, as shown in FIGS. 5D and 5E. Thus, the source lines 114 are electrically separated from the gate lines 113. Then, a protective film 127 is formed on the insulating film 126. This step is similar to that of forming the insulating film 126. At this time, the protective film 127 fills in the trench parts, as shown in FIG. 5F. Exposing the un-anodized parts of the source lines 114 by removing the protective film 127 and the insulating film 126 on the second parts 122 of the source lines 114 form the contact portions as shown in FIG. 5G. Thus, the source lines 114, which are separated into two parts by the gate lines 113, are electrically connected to the contact parts by forming a conductive layer 128 on the insulating film 126 as shown in FIG. 5H. Thus, crossing parts of the gate lines 113 and the source lines 114 are formed.

Preferred Embodiment 2

With reference to FIGS. 6A to 6F, another method for manufacturing a liquid crystal display device including a coplanar line structure according to the present invention will be described.

Figure 6A:
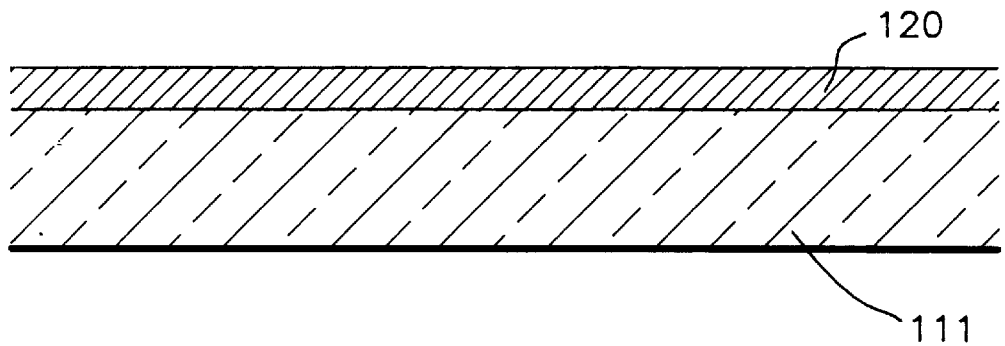
FIGS. 6A to 6F are sectional views illustrating another manufacturing process of a liquid crystal display device including a coplanar line structure of the present invention.
Figure 6B:
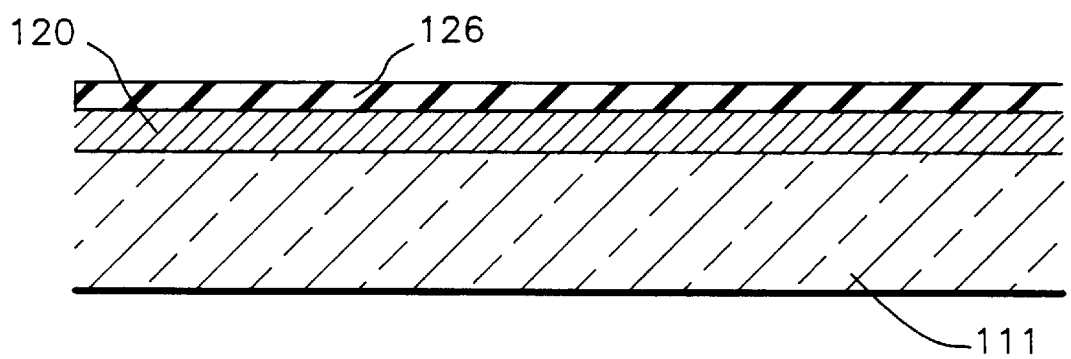

First, a metal layer 120, which is to be formed into a plurality of gate 113 and source 114 lines, is formed on a transparent glass substrate 111 by depositing a metal 120. The metal 120 need not be anodized for preventing a hillock on the surface of the metal 120, as shown in FIG. 6A. An insulating film 126 made of SiNx or any compound having SiNx is formed on the metal 120, as shown in FIG. 6B.

Figure 6C:
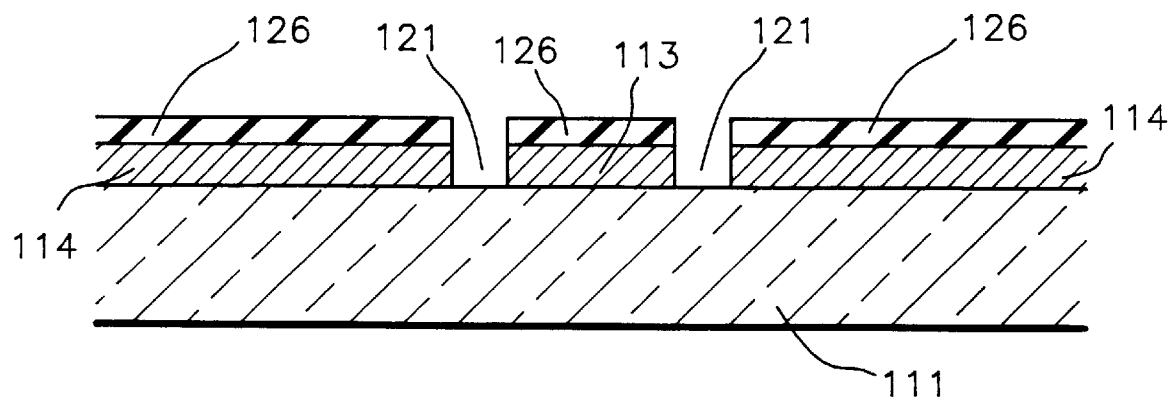

Trenches are formed by removing a first part 121 at both sides of the source lines 114 in contact with the gate lines 113 and the corresponding portion of the insulating film 126 thereon, as shown in FIG. 6C. Thus, the trenches create the source lines 114 and gate line 113 which are electrically separated from each other.

Figure 6D:
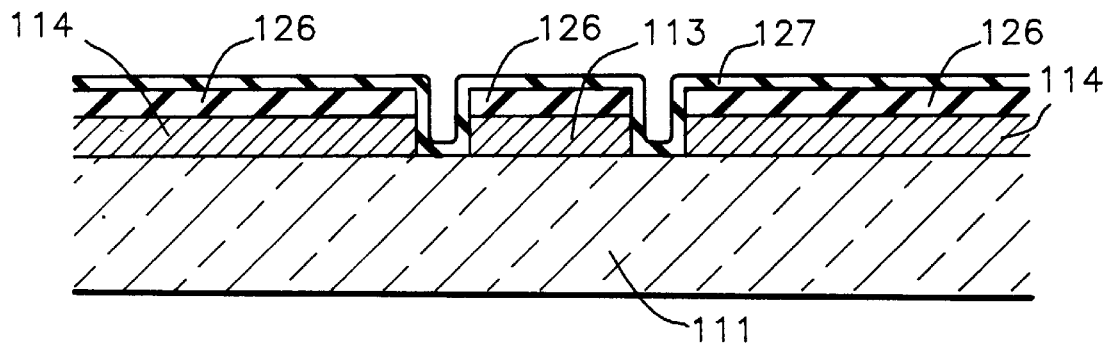
Figure 6E:
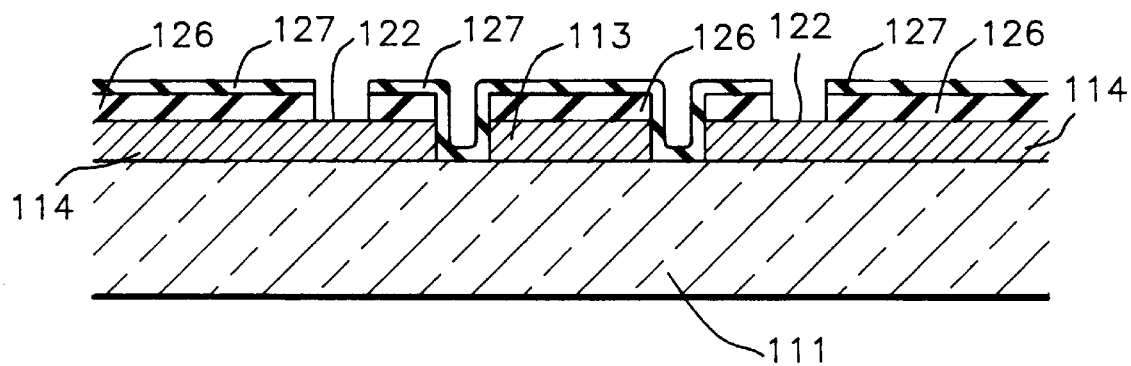
Figure 6F:
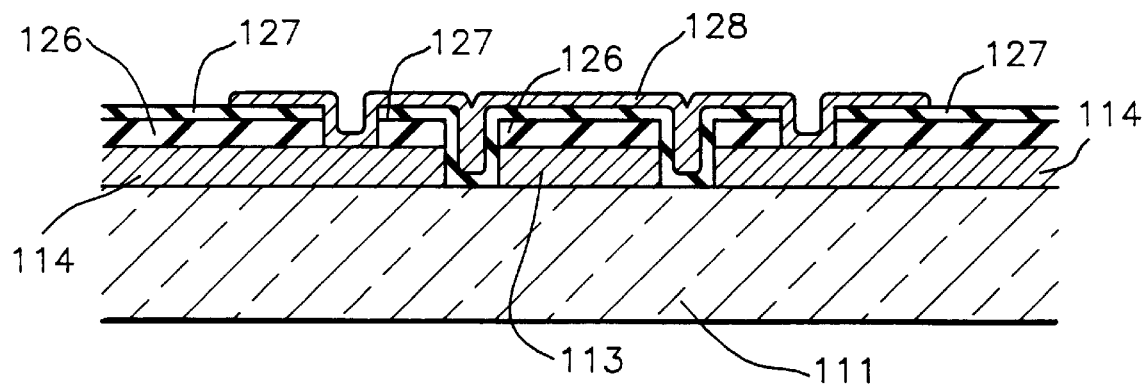

Then, a protective film 127 is formed on the insulating film 126. This step is similar to the step of forming the insulating film 126. At this time, the protective film 127 also forms in the trench parts, as shown in FIG. 6D. Contact holes are formed to expose a portion 122 (second part) of the source lines 114 placed at a predetermined distance from the gate lines 113 by removing the protective film 127 and the insulating film 126 corresponding to the second parts 122, as shown in FIG. 6E. Thus, the source lines 114, which are separated into two parts by the gate lines 113, become electrically connected to the contact parts by forming a conductive layer 128 on the insulating film 126, as shown in FIG. 6F. Thus, the gate lines 113 and the source lines 114 are formed which cross each other.

The above-mentioned steps can be performed at the same time as the step of manufacturing TFTs. The step of forming the conductive layer 128 can be performed simultaneously with the step of forming the pixel electrodes 112, so that the source lines 114 separated into two parts by the gate lines 113 can be connected. For this reason, the same material used for manufacturing the conductive layer 128 may be used for manufacturing the pixel electrodes 112.

Consequently, the liquid crystal display devices manufactured by this method have a line structure including the gate lines 113 and the source lines 114 that are perpendicular to each other on the same layer level, and the source lines 114 are electrically separated by the trench parts on both sides of the gate lines 113, as shown in FIG. 4. Also, the anodized film 125 and the insulating film 126 are sequentially formed on the gate lines 113 and the source lines 114, except the contact parts placed at a predetermined distance from both sides of the trench parts. Whereas the protective film 127 is formed on the insulating film 126 and in the trenches, the source lines 114 separated by the trenches are formed below the protective film 127 and are electrically connected to each other through the contact parts.

Accordingly, in the present invention, the step of forming the conductive layer is performed at the same time as the step of forming the pixel electrode. Thus, the conductive layer and the pixel electrode are formed in one step. For this reason, it is preferable to use the same material when forming the pixel electrodes as the conductive layer.

The manufacturing process of the present invention results in saving manufacturing time and cost of materials, since the extra process of forming the source lines is not necessary because the gate lines and the source lines can be formed in one patterning step. Also, an open-line caused by the step-coverage can be prevented, since the source lines do not cross over the gate lines. Instead, the separated source lines are connected by metal lines formed thereon through the contact parts, while the step-coverage is caused when the source lines cross over the gate line. Furthermore, the signal is significantly improved and not delayed with less parasitic capacitance, since the protective film, which is formed between intersecting gate lines and source lines, becomes thicker.

It will be apparent to those skilled in the art that various modifications and variations can be made in the liquid crystal display and method of the present invention without departing from the spirit or scope of the invention. Thus, it is intended that the present invention cover the modifications and variations of this invention provided they come within the scope of the appended claims and their equivalents.

What is claimed is:

1. A liquid crystal display device including a pixel electrode and a thin film transistor having gate, source, and drain electrodes, comprising:
   a substrate;
   a plurality of gate lines and source lines on the substrate and in a same layer;
   a plurality of trench portions on sides of the gate lines, the trench portions electrically separating the source lines from the gate lines, each separated source line having a contact area placed at a distance from the trench portions;
   a first insulating layer on the source and gate lines;
   a second insulating layer on the first insulating film and in the trench portions;
   a conductive layer on the second insulating layer, the conductive layer electrically connecting the source lines to each other through the contact areas, the conductive layer including the source electrode, the drain electrode, and the pixel electrode.

2. The liquid crystal display device according to claim 1, wherein the substrate includes a transparent glass material.

3. The liquid crystal display device according to claim 1, wherein the gate and source electrodes are substantially perpendicular to each other.

4. A liquid crystal display device including a pixel electrode and a thin film transistor having gate, source, and drain electrodes, comprising:
   a transparent glass substrate;
   a plurality of gate lines and source lines on the glass substrate, the gate and source lines being perpendicular to each other and in a same layer;
   a plurality of trench portions on sides of the gate lines, the trench portions electrically separating the source lines from the gate lines, each separated source line having a contact area placed at a distance from the trench portions;
   an anodized layer on the gate lines and the source lines excluding the contact area;
   an insulating layer on the anodized layer;
   a protective layer on the insulating layer and in the trench portions;
   a conductive layer on the protective layer and electrically connecting the source lines to each other through the contact areas, the conductive layer including the source electrode, the drain electrode, and the pixel electrode.

* * * * *